United States Patent
Wagner et al.

(10) Patent No.: US 12,304,061 B2
(45) Date of Patent: *May 20, 2025

(54) SYSTEMS AND METHODS FOR PROVIDING HIGH FLOW VACUUM ACQUISITION IN AUTOMATED SYSTEMS

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, White Plains, NY (US); Michael Dawson-Haggerty, Pittsburgh, PA (US); Christopher Geyer, Arlington, MA (US); Thomas Koletschka, Somerville, MA (US); Kyle Maroney, Saunderstown, RI (US); Matthew T. Mason, Atlanta, GA (US); Gene Temple Price, Somerville, MA (US); Joseph Romano, Arlington, MA (US); Daniel Carlton Smith, Wexford, PA (US); Siddhartha Srinivasa, Bedford, MA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,681

(22) Filed: Feb. 16, 2024

(65) Prior Publication Data

US 2024/0278438 A1 Aug. 22, 2024

Related U.S. Application Data

(63) Continuation of application No. 17/078,348, filed on Oct. 23, 2020, now Pat. No. 11,945,100, which is a
(Continued)

(51) Int. Cl.
  *B25J 15/06* (2006.01)
  *B25J 9/16* (2006.01)
  *B25J 13/08* (2006.01)

(52) U.S. Cl.
  CPC ......... *B25J 15/0616* (2013.01); *B25J 9/1612* (2013.01); *B25J 13/085* (2013.01);
  (Continued)

(58) Field of Classification Search
  CPC B25J 15/0625; B25J 15/0658; B25J 15/0675; B25J 9/1612; B25J 13/085;
  (Continued)

(56) References Cited

U.S. PATENT DOCUMENTS

| | | |
|---|---|---|
| 2,853,333 A | 9/1958 | Littell |
| 3,005,652 A | 10/1961 | Helm |

(Continued)

FOREIGN PATENT DOCUMENTS

| | | |
|---|---|---|
| CA | 2053401 A1 | 7/1992 |
| CA | 2998128 C | 11/2023 |

(Continued)

OTHER PUBLICATIONS

Anver Corporation, "Vacuum Tube Lifting Systems," Nov. 22, 2004 (http://www.jrgindustries.com/assets/anver.pdf).
(Continued)

*Primary Examiner* — James R Bidwell
(74) *Attorney, Agent, or Firm* — Gesmer Updegrove LLP

(57) ABSTRACT

A system is disclosed for providing high flow vacuum control to an end effector of an articulated arm. The system includes a high flow vacuum source that provides an opening with an area of high flow vacuum at the end effector such that objects may be engaged while permitting substantial
(Continued)

flow of air through the opening, and a load detection system for characterizing the load presented by the object.

33 Claims, 12 Drawing Sheets

Related U.S. Application Data continuation of application No. 16/704,463, filed on Dec. 5, 2019, now Pat. No. 10,857,682, which is a continuation of application No. 16/124,982, filed on Sep. 7, 2018, now Pat. No. 10,576,641, which is a continuation of application No. 15/260,014, filed on Sep. 8, 2016, now Pat. No. 10,118,300.

(60) Provisional application No. 62/262,136, filed on Dec. 2, 2015, provisional application No. 62/215,489, filed on Sep. 8, 2015.

(52) U.S. Cl.
CPC ....... *B25J 15/0625* (2013.01); *B25J 15/0658* (2013.01); *B25J 15/0675* (2013.01); *B25J 15/0683* (2013.01); *B25J 15/0691* (2013.01)

(58) Field of Classification Search
CPC .. B25J 15/0616; B66C 1/0256; B66C 1/0268; Y10S 901/40
See application file for complete search history.

(56) References Cited

U.S. PATENT DOCUMENTS

| | | | |
|---|---|---|---|
| 3,195,941 A | 7/1965 | Morey | |
| 3,637,249 A | 1/1972 | Kuhl et al. | |
| 3,743,340 A | 7/1973 | Williamann | |
| 3,959,864 A | 6/1976 | Tell | |
| 4,389,064 A | 6/1983 | Laverriere | |
| 4,412,775 A | 11/1983 | Molitor et al. | |
| 4,466,778 A | 8/1984 | Volkmann | |
| 4,495,968 A | 1/1985 | Kist | |
| 4,557,659 A | 12/1985 | Scaglia | |
| 4,600,229 A | 7/1986 | Oten | |
| 4,745,681 A | 5/1988 | Hollis, Jr. et al. | |
| 4,787,812 A | 11/1988 | Göpfert | |
| 4,828,304 A | 5/1989 | No et al. | |
| 4,880,358 A | 11/1989 | Lasto | |
| 4,960,364 A | 10/1990 | Tell | |
| 5,024,575 A | 6/1991 | Anderson | |
| 5,035,456 A | 7/1991 | Messinger | |
| 5,088,878 A | 2/1992 | Focke et al. | |
| 5,190,332 A | 3/1993 | Nagai et al. | |
| 5,192,070 A | 3/1993 | Nagai et al. | |
| 5,207,465 A | 5/1993 | Rich | |
| 5,683,227 A | 11/1997 | Nagai et al. | |
| 5,727,832 A | 3/1998 | Holter | |
| 5,752,729 A | 5/1998 | Crozier et al. | |
| 5,764,013 A | 6/1998 | Yae | |
| 5,791,861 A | 8/1998 | Seelig | |
| 5,865,487 A | 2/1999 | Gore et al. | |
| 6,015,174 A | 1/2000 | Raes et al. | |
| 6,135,522 A | 10/2000 | Su et al. | |
| 6,244,640 B1 | 6/2001 | Le Bricquer et al. | |
| 6,382,692 B1 | 5/2002 | Schmalz et al. | |
| 6,397,876 B1 | 6/2002 | Golden et al. | |
| 6,817,639 B2 | 11/2004 | Schmalz et al. | |
| 7,017,961 B1 | 3/2006 | Parnell et al. | |
| 7,140,389 B2 | 11/2006 | Schnatterer et al. | |
| 7,261,350 B2 * | 8/2007 | Isetani ................. | B25J 15/0616 294/185 |
| 7,263,890 B2 | 9/2007 | Takahashi | |
| 7,618,074 B2 | 11/2009 | Zimmer | |
| 7,637,548 B2 | 12/2009 | Fukano et al. | |
| 7,677,622 B2 | 3/2010 | Dunkmann et al. | |
| 7,726,715 B2 | 6/2010 | Nagasawa et al. | |
| 8,070,203 B2 | 12/2011 | Schaumberger | |
| 8,096,598 B2 | 1/2012 | Perlman | |
| 8,132,835 B2 | 3/2012 | Ban et al. | |
| 8,267,386 B2 | 9/2012 | Schaaf et al. | |
| 8,565,915 B2 | 10/2013 | Dillon | |
| 8,641,329 B2 | 2/2014 | Barrios | |
| 8,662,861 B2 | 3/2014 | Tell | |
| 8,721,321 B2 | 5/2014 | Middleton et al. | |
| 8,777,284 B2 | 7/2014 | Schaller et al. | |
| 9,061,868 B1 | 6/2015 | Paulsen et al. | |
| 9,120,622 B1 | 9/2015 | Elazary et al. | |
| 9,227,323 B1 | 1/2016 | Konolige et al. | |
| 9,457,477 B1 | 10/2016 | Rublee et al. | |
| 9,492,923 B2 | 11/2016 | Wellman et al. | |
| 9,604,363 B2 | 3/2017 | Ban | |
| 9,623,570 B1 | 4/2017 | Krahn et al. | |
| 9,656,813 B2 | 5/2017 | Dunkmann et al. | |
| 9,687,985 B2 | 6/2017 | Ueno et al. | |
| 9,999,977 B2 | 6/2018 | Wagner et al. | |
| 10,007,827 B2 | 6/2018 | Wagner et al. | |
| 10,118,300 B2 | 11/2018 | Wagner et al. | |
| 10,315,315 B2 | 6/2019 | Wagner et al. | |
| 10,399,232 B2 | 9/2019 | Oestergaard et al. | |
| 10,399,236 B2 | 9/2019 | Wagner et al. | |
| 10,576,641 B2 | 3/2020 | Wagner et al. | |
| 10,596,711 B2 | 3/2020 | Wagner et al. | |
| 10,710,822 B2 | 7/2020 | Tommesani | |
| 11,945,100 B2 * | 4/2024 | Wagner ................ | B25J 15/0658 |
| 2001/0045755 A1 | 11/2001 | Schick et al. | |
| 2002/0011735 A1 | 1/2002 | Nagai | |
| 2002/0185575 A1 | 12/2002 | Kalb | |
| 2003/0038491 A1 | 2/2003 | Schmalz et al. | |
| 2003/0164620 A1 | 9/2003 | Schmalz et al. | |
| 2006/0242785 A1 | 11/2006 | Cawley et al. | |
| 2008/0179224 A1 | 7/2008 | Van Bossuyt | |
| 2009/0019818 A1 | 1/2009 | Gilmore et al. | |
| 2010/0040450 A1 | 2/2010 | Parnell | |
| 2010/0125361 A1 | 5/2010 | Mougin et al. | |
| 2010/0133456 A1 | 6/2010 | Baumbach et al. | |
| 2013/0129464 A1 | 5/2013 | Regan et al. | |
| 2013/0232918 A1 | 9/2013 | Lomerson et al. | |
| 2013/0232919 A1 | 9/2013 | Jaconelli | |
| 2013/0277999 A1 | 10/2013 | Schaller et al. | |
| 2014/0005831 A1 | 1/2014 | Naderer et al. | |
| 2015/0081090 A1 | 3/2015 | dong | |
| 2015/0298316 A1 | 10/2015 | Accou et al. | |
| 2015/0328779 A1 | 11/2015 | Bowman et al. | |
| 2015/0375401 A1 | 12/2015 | Dunkmann et al. | |
| 2016/0136816 A1 | 5/2016 | Pistorino | |
| 2016/0221187 A1 | 8/2016 | Bradski et al. | |
| 2016/0244262 A1 | 8/2016 | O'Brien et al. | |
| 2016/0271805 A1 | 9/2016 | Kuolt et al. | |
| 2017/0050315 A1 | 2/2017 | Henry et al. | |
| 2017/0057091 A1 | 3/2017 | Wagner et al. | |
| 2017/0072572 A1 | 3/2017 | Wagner et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0120455 A1 | 5/2017 | Wagner et al. | |
| 2018/0265311 A1 | 9/2018 | Wagner et al. | |
| 2018/0333866 A1 | 11/2018 | Wagner et al. | |
| 2019/0001507 A1 | 1/2019 | Wagner et al. | |
| 2019/0047787 A1 | 2/2019 | Fosnight et al. | |
| 2019/0091879 A1 | 3/2019 | Wagner et al. | |
| 2019/0299423 A1 | 10/2019 | Wagner et al. | |
| 2020/0108512 A1 | 4/2020 | Wagner et al. | |
| 2020/0164526 A1 | 5/2020 | Wagner et al. | |
| 2021/0039267 A1 | 2/2021 | Wagner et al. | |
| 2021/0171295 A1 | 6/2021 | Azuma et al. | |
| 2022/0040867 A1 | 2/2022 | Wagner et al. | |
| 2022/0152845 A1 | 5/2022 | Allen et al. | |

FOREIGN PATENT DOCUMENTS

| | | |
|---|---|---|
| CN | 1390438 A | 1/2003 |
| CN | 1744970 A | 3/2006 |
| CN | 101530954 A | 9/2009 |
| CN | 101592498 A | 12/2009 |

(56) References Cited

FOREIGN PATENT DOCUMENTS

| | | |
|---|---|---|
| CN | 201586976 U | 9/2010 |
| CN | 201792340 U | 4/2011 |
| CN | 103987637 A | 8/2014 |
| CN | 104093992 A | 10/2014 |
| CN | 108290297 A | 7/2018 |
| CN | 108349093 A | 7/2018 |
| CN | 108906907 A | 11/2018 |
| CN | 109531554 A | 3/2019 |
| CN | 113954106 A | 1/2022 |
| CN | 113954107 A | 1/2022 |
| CN | 116583385 A | 8/2023 |
| DE | 3810989 A1 | 8/1989 |
| DE | 10121344 A1 | 11/2002 |
| DE | 102007054867 A1 | 5/2009 |
| DE | 102012009011 A1 | 12/2012 |
| DE | 102011115951 A1 | 4/2013 |
| DE | 112018005784 T5 | 8/2020 |
| EP | 1348873 A1 | 10/2003 |
| EP | 1671906 A1 | 6/2006 |
| EP | 1256421 B1 | 1/2008 |
| EP | 2014587 | 1/2009 |
| EP | 2823899 A1 | 1/2015 |
| EP | 2960024 A2 | 12/2015 |
| EP | 3347172 B1 | 4/2023 |
| EP | 3347173 B1 | 8/2023 |
| FR | 2592827 A1 | 7/1987 |
| FR | 2617078 A1 | 12/1998 |
| FR | 2928855 A1 | 9/2009 |
| JP | S6155399 A | 3/1986 |
| JP | H0769470 A | 3/1995 |
| JP | 2010201536 A | 9/2010 |
| TW | 201400253 A | 1/2014 |
| WO | 0064790 A1 | 11/2000 |
| WO | 2014114619 A1 | 7/2014 |
| WO | 2014161549 A1 | 10/2014 |
| WO | 2015162390 A1 | 10/2015 |
| WO | 2017035466 A1 | 3/2017 |
| WO | 2017044627 A1 | 3/2017 |
| WO | 2017044632 A1 | 3/2017 |
| WO | 2019230893 A1 | 12/2019 |
| WO | 2020040103 A1 | 2/2020 |
| WO | 2022109101 | 5/2022 |

OTHER PUBLICATIONS

Communication pursuant to Article 94(3) EPC issued by the European Patent Office in related European Patent Application No. 16767466.2 on Jul. 15, 2021, 5 pages.
Communication pursuant to Article 94(3) EPC issued by the European Patent Office in related European Patent Application No. 16767468.8 on Jul. 15, 2021, 5 pages.
Communication pursuant to Rules 161(1) and 162 EPC issued by the European Patent Office on Apr. 17, 2018 in related European Patent Application No. 16767466.2, 3 pages.
Communication pursuant to Rules 161(1) and 162 EPC issued by the European Patent Office on Apr. 17, 2018 in related European Patent Application No. 16767468.8, 3 pages.
Examiner's Report issued by the Canadian Intellectual Property Office on Nov. 22, 2019 in related Canadian Patent Application No. 2,998,128, 3 pages.
Examiner's Report issued by the Canadian Intellectual Property Office on Nov. 22, 2019 in related Canadian Patent Application No. 2,998,122, 3 pages.
Examiner's Report issued by the Canadian Intellectual Property Office on Jul. 23, 2020 in related Canadian Patent Application No. 2,998,122, 3 pages.
Examiner's Report issued by the Innovation, Science and Economic Development Canada in related Canadian Patent Application No. 2,998,128 on Jul. 22, 2020, 3 pages.
Examiner's Report issued by the Innovation, Science and Economic Development Canada (Canadian Intellectual Property Office) in related Canadian Patent Application No. 2,998,122 on Feb. 9, 2021, 3 pages.
Examiner's Report issued by the Innovation, Science and Economic Development Canada Canadian Intellectual Property Office in related Canadian Patent Application No. 2,998,128 on Oct. 14, 2021, 3 pages.
Examiner's Report issued by the Innovation, Science and Economic Development Canada Canadian Intellectual Property Office in related Canadian Patent Application No. 2,998,128 on Aug. 15, 2021, 5 pages.
Examiner's Report issued by the Innovation, Science and Economic Development Canada (Canadian Intellectual Property Office) in related Canadian Patent Application No. 3,156,185 on Aug. 29, 2023, 5 pages.
Examiner's Report issued by the Innovation, Science and Economic Development Canada (Canadian Intellectual Property Office) in related Canadian Patent Application No. 3,178,182 on Apr. 16, 2024, 7 pages.
Examiner's Report issued by the Innovation, Science and Economic Development Canada (Canadian Intellectual Property Office) in related Canadian Patent Application No. 3,178,169 on Apr. 9, 2024, 6 pages.
Examiner's Report issued by the Innovation, Science and Economic Development Canada (Canadian Intellectual Property Office) in related Canadian Patent Application No. 3,178,166 on Apr. 9, 2024, 5 pages.
Extended European Search Report issued by the European Patent Office in related European Patent Application No. 23163114.4 on Jun. 2, 2023, 8 pages.
Final Office Action issued by the U.S. Patent and Trademark Office in related U.S. Appl. No. 15/259,939 on Mar. 7, 2018, 7 pages.
Final Office Action issued by the U.S. Patent and Trademark Office in related U.S. Appl. No. 16/047,713 on Apr. 4, 2019, 7 pages.
Final Office Action issued by the U.S. Patent and Trademark Office in related U.S. Appl. No. 15/260,014 on Aug. 14, 2017, 8 pages.
Final Office Action issued by the U.S. Patent and Trademark Office in related U.S. Appl. No. 15/260,014 on Jan. 16, 2018, 7 pages.
Final Office Action issued by the U.S. Patent and Trademark Office in related U.S. Appl. No. 16/124,982 on Jul. 26, 2019, 9 pages.
Final Office Action issued by the United States Patent and Trademark Office in related U.S. Appl. No. 17/078,348 on Jul. 12, 2023, 7 pages.
First Examiner's Report issued by the Canadian Intellectual Property Office on Feb. 28, 2019 in related Canadian Patent Application No. 2,998,122, 4 pages.
First Examiner's Report issued by the Canadian Intellectual Property Office on Mar. 1, 2019 in related Canadian Patent Application No. 2,998,128, 3 pages.
First Office Action, and its English translation, issued by the China National Intellectual Property Administration issued in related Chinese Patent Application No. 201680065068.5 on Jul. 6, 2020, 21 pages.
First Office Action, and its English translation, issued by the China National Intellectual Property Administration issued in related Chinese Patent Application No. 201680063679.6 on Aug. 4, 2020, 2020, 19 pages.
Herbert, Timothy M., et al., "A Robotic Gripper System for Limp Material Manipulation: Hardware and Software Development and Integration," Proceedings of the 1997 IEEE Int'l Conf. on Robotics & Automation, Albuquerque, NM, Apr. 1997, pp. 15-21.
International Preliminary Report on Patentability issued by the International Bureau of WIPO on Mar. 13, 2018 in related International Application No. PCT/US2016/050781, 10 pages.
International Preliminary Report on Patentability issued by the International Bureau of WIPO on Mar. 13, 2018 in related International Application No. PCT/US2016/050788, 8 pages.
International Search Report and Written Opinion issued by the International Searching Authority in related International Application No. PCT/US2016/050781 on Jan. 18, 2017, 15 pages.
International Search Report and Written Opinion issued by the International Searching Authority in related International Application No. PCT/US2016/050788 on Dec. 2, 2016, 11 pages.
Moura, Jauro et al., "Neural Network Based Perturbation Identification Approach for High Accuracy Tracking Control of Robotic

(56) References Cited

OTHER PUBLICATIONS

Manipulators," Proceedings of IMECE '03, 2003 ASME Int'l Mechanical Engineering Congress, Washington, D.C., Nov. 15-21, 2003, pp. 1189-1197.

Non-Final Office Action issued by the U.S. Patent and Trademark Office in related U.S. Appl. No. 16/047,713 on Nov. 16, 2018, 8 pages.

Non-Final Office Action issued by the U.S. Patent and Trademark Office in related U.S. Appl. No. 15/259,939 on Aug. 30, 2017, 6 pages.

Non-Final Office Action issued by the U.S. Patent and Trademark Office in related U.S. Appl. No. 15/259,939 on Jun. 18, 2018, 6 pages.

Non-Final Office Action issued by the U.S. Patent and Trademark Office in related U.S. Appl. No. 15/260,014 on Apr. 21, 2017, 8 pages.

Non-Final Office Action issued by the U.S. Patent and Trademark Office in related U.S. Appl. No. 16/204,667 on Apr. 16, 2019, 8 pages.

Non-Final Office Action issued by the U.S. Patent and Trademark Office in related U.S. Appl. No. 15/259,939 on Dec. 12, 2018, 6 pages.

Non-Final Office Action issued by the U.S. Patent and Trademark Office in related U.S. Appl. No. 16/396,224 on Oct. 23, 2019, 6 pages.

Non-Final Office Action issued by the U.S. Patent and Trademark Office in related U.S. Appl. No. 15/260,014 on Nov. 3, 2017, 7 pages.

Non-Final Office Action issued by the U.S. Patent and Trademark Office in related U.S. Appl. No. 15/260,014 on Mar. 1, 2018, 7 pages.

Non-Final Office Action issued by the U.S. Patent and Trademark Office in related U.S. Appl. No. 16/124,982 on Jan. 9, 2019, 8 pages.

Non-Final Office Action issued by the U.S. Patent and Trademark Office in related U.S. Appl. No. 16/704,463 on Jun. 11, 2020, 26 pages.

Non-Final Office Action issued by the United States Patent and Trademark Office in related U.S. Appl. No. 16/776,655 on May 18, 2021, 8 pages.

Non-Final Office Action issued by the United States Patent and Trademark Office in related U.S. Appl. No. 17/078,348 on Dec. 22, 2022, 8 pages.

Notice on the First Office Action, along with its English translation, issued by the China National Intellectual Property Administration in related Chinese Patent Application No. 202111357085.5 on Mar. 30, 2023, 15 pages.

Notice on the First Office Action, along with its English translation, issued by the China National Intellectual Property Administration in related Chinese Patent Application No. 202111355718.9 on Mar. 31, 2023, 17 pages.

Notice on the Second Office Action and Second Office Action, along with its English translation, issued by the China National Intellectual Property Administration issued in related Chinese Patent Application No. 201680065068.5 on Mar. 4, 2021, 8 pages.

Notice on the Second Office Action and the Second Office Action, along with its English translation, issued by the China National Intellectual Property Administration issued in related Chinese Patent Application No. 201680063679.6 on May 7, 2021, 29 pages.

Vittor, Timothy, et al., "A Flexible Robotic Gripper for Automation of Assembly Tasks: A Technology Study on a Gripper for Operation in Shared Human Environments," Proceedings of the ASME, Dynamic Systems & Control Division—2003, vol. 72-22, 2003 ASME Int'l Mechanical Engineering Congress, Washington, D.C., Nov. 15-21, 2003.

Annex to Form PCT/ISA/206 (Partial Search), Communication Relating to the Results of the Partial International Search issued by the European Patent Office (as International Searching Authority) issued in related International Application No. PCT/US2021/059841 on Mar. 9, 2022, 3 pages.

International Preliminary Report on Patentability issued by the International Bureau of WIPO in related International Application No. PCT/US2022/045556 on Apr. 26, 2024, 8 pages.

Notification of Transmittal of the International Search Report and the Written Opinion of the International Searching Authority along with the International Search Report and Written Opinion of the International Searching Authority, the European Patent Office, issued in related International Application No. PCT/US2021/059841 on May 3, 2022, 20 pages.

\* cited by examiner

SYSTEMS AND METHODS FOR PROVIDING HIGH FLOW VACUUM ACQUISITION IN AUTOMATED SYSTEMS

PRIORITY

The present application is a continuation of U.S. patent application Ser. No. 17/078,348, filed Oct. 23, 2020, which is a continuation of U.S. patent application Ser. No. 16/704,463, filed Dec. 5, 2019, now U.S. Pat. No. 10,857,682, issued Dec. 8, 2020, which is a continuation of U.S. patent application Ser. No. 16/124,982, filed Sep. 7, 2018, now U.S. Pat. No. 10,576,641, issued Mar. 3, 2020, which is a continuation of U.S. patent application Ser. No. 15/260,014, filed Sep. 8, 2016, now U.S. Pat. No. 10,118,300, issued Nov. 6, 2018, which claims priority to U.S. Provisional Patent Application Ser. No. 62/215,489 filed Sep. 8, 2015, as well as U.S. Provisional Patent Application Ser. No. 62/262,136 filed Dec. 2, 2015, the disclosures of which are hereby incorporated by reference in their entireties.

BACKGROUND

The invention generally relates to robotic and other sortation systems, and relates in particular to robotic systems having an articulated arm with an end effector that employs vacuum pressure to engage objects in the environment.

Most vacuum grippers employ vacuum pressures well below 50% of atmospheric pressure, and are referred to herein as high vacuum. A typical source for a high vacuum gripper is a Venturi ejector, which produces high vacuum but low maximum air flow. Because of the low flow, it is essential to get a good seal between a vacuum gripper and an object, and it is also important to minimize the volume to be evacuated.

Suppliers of ejectors and related system components include Vaccon Company, Inc. of Medway, MA, Festo US Corporation of Hauppauge, NY, Schmalz, Inc. of Raleigh, NC and others. In some instances where a good seal is not possible, some systems use high flow devices. Typical high flow devices are air amplifiers and blowers, which produce the desired flows, but cannot produce the high vacuum of a high vacuum source. High flow sources include the side-channel blowers supplied by Elmo Rietschle of Gardner, Denver, Inc. of Quincy, IL, Fuji Electric Corporation of America of Edison, NJ, and Schmalz, Inc. of Raleigh, NC. It is also possible to use air amplifiers as supplied by EDCO USA of Fenton, MO and EXAIR Corporation of Cincinnati, OH. Multistage ejectors are also known to be used to evacuate a large volume more quickly, wherein each stage provides higher levels of flow but lower levels of vacuum.

Despite the variety of vacuum systems, however, there remains a need for an end effector in a robotic or other sortation system that is able to accommodate a wide variety of applications, involving engaging a variety of types of items. There is further a need for an end effector that is able to provide high flow and that is able to handle a wide variety of objects weights.

SUMMARY

In accordance with an embodiment, the invention provides a system for providing high flow vacuum control to an end effector of an articulated arm. The system includes a high flow vacuum source that provides an opening with an area of high flow vacuum at the end effector such that objects may be engaged while permitting substantial flow of air through the opening, and a load detection system for characterizing the load presented by the object.

In accordance with another embodiment, the invention provides an object acquisition system that includes a high flow vacuum source that provides an opening with an area of high flow vacuum such that objects may be engaged while permitting substantial flow of air through the opening, and a load assessment system that assesses the load responsive to the flow and any of a load weight or load balance.

In accordance with a further embodiment, the invention provides a method of characterizing a load presented by an object at an end effector in a high flow vacuum system. The method includes the steps of providing a high flow vacuum at an opening at the end effector, engaging an object at the opening while permitting substantial flow of air through the opening, and characterizing the load presented by the object.

BRIEF DESCRIPTION OF THE DRAWINGS

The following description may be further understood with reference to the accompanying drawings in which.

The drawings are shown for illustrative purposes only and are not to scale.

DETAILED DESCRIPTION

There are numerous applications for a novel gripping system that could handle a broad variety of objects, varying in size, weight, and surface properties. In accordance with certain embodiments, the invention provides a system for providing high flow vacuum control to an end effector of an articulated arm. In accordance with various embodiments, the invention provides a dynamic high flow gripping system, and may optionally include a mechanism to select between the high flow source and a high vacuum source, depending on the application. High flow vacuum systems of the invention may therefore optionally be used with high vacuum sources.

The system, for example, may include a first vacuum source for providing a first vacuum pressure with a first maximum air flow rate; and a second vacuum source for providing a second vacuum pressure with a second maximum air flow rate, wherein the second vacuum pressure is higher than the first vacuum pressure and wherein the second maximum air flow rate is greater than the first maximum air flow rate. The flow rates are characterized as maximum air flow rates because, when an object is engaged at an end effector, the flow rate may drop significantly. The high flow source may be used together with a high vacuum source, or as a single source.

Figure 1:
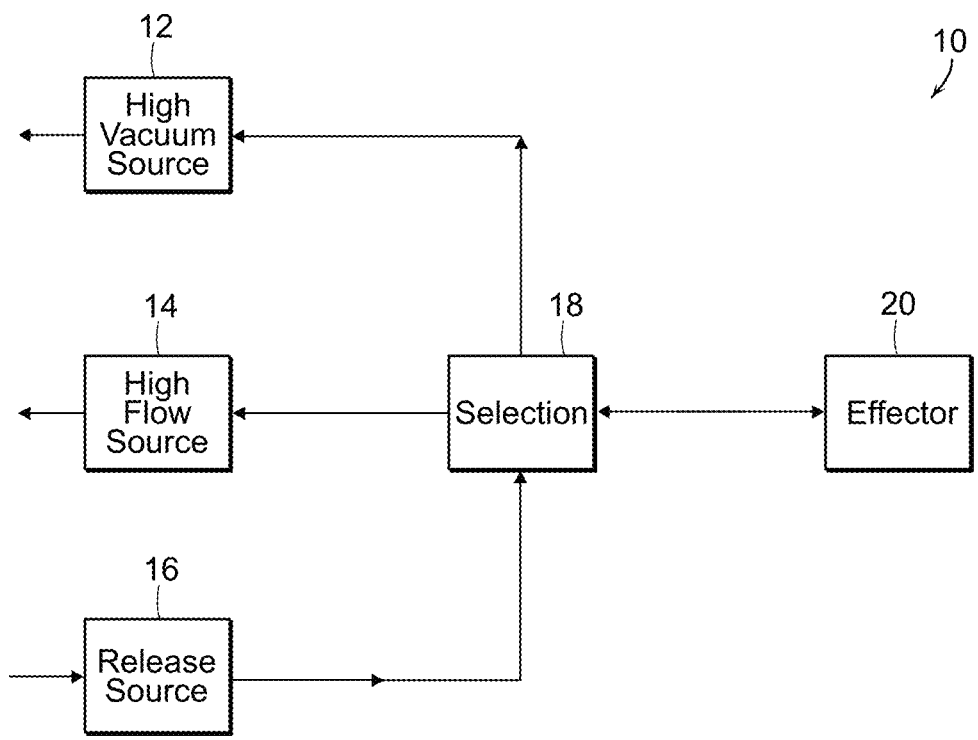
FIG. 1 shows an illustrative block diagrammatic view of a system in accordance with an embodiment of the present invention.

FIG. 1, for example, shows a system 10 in accordance with an embodiment of the present invention in which an optional high vacuum source 12 is provided as well as a high flow source 14 and a release source 16 that are each coupled to a selection unit 18, that is coupled to an end effector 20. The selection unit 18 selects between the high vacuum source 12, high flow source 14 and the release source 16 for providing any of high vacuum, vacuum with high flow, or a release flow to the end effector. FIG. 1 therefore shows a general form of the invention, comprising mechanisms for producing high vacuum and high flow, a release source providing either atmospheric pressure via a vent or high pressure (blow off) via a compressor or reservoir, and a mechanism for selecting the source best suited to the present situation.

Figure 2:
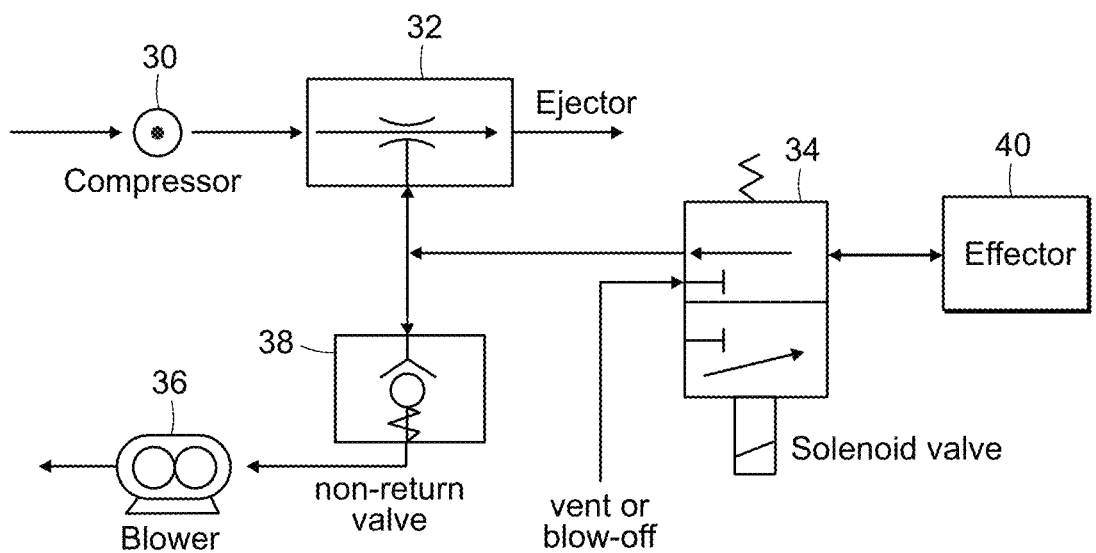
FIG. 2 shows an illustrative diagrammatic view of an example of a system of FIG. 1.

In particular, FIG. 2 shows a system in accordance with an embodiment of the invention that includes a compressor 30 that is coupled to an ejector 32 to provide a high vacuum source that is coupled to a solenoid valve 34. A blower 36 is also coupled to the solenoid valve 34 via a non-return valve 38, and the blower 36 provides a vacuum source with a high maximum flow rate. A vent or blow-off source is also provided to the solenoid valve 34, the output of which is provided to an end effector 40. The system therefore, provides the ejector 32 as the high vacuum source, the regenerative blower 36 as the high flow source, the non-return valve 38 as a passive selection mechanism, and the solenoid valve 34 connecting the effector to the release source, either vent or blow-off.

The vacuum pressure provided by the ejector 32 may be, for example, at least about 90,000 Pascals below atmospheric and the vacuum pressure provided by the blower 36 may be only no more than about 25,000 Pascals below atmospheric in some examples, and no more than about 50,000 Pascals below atmospheric in other examples. The vacuum pressure provided by the blower 36 is therefore higher than the vacuum pressure provided by the ejector 32. The maximum air flow rate of the ejector may be, for example, no more than about 5 cubic feet per minute (e.g., 1-2 cubic feet per minute), and the maximum air flow rate of the blower may be, for example at least about 100 cubic feet per minute (e.g., 130-140 cubic feet per minute).

Figure 3A:
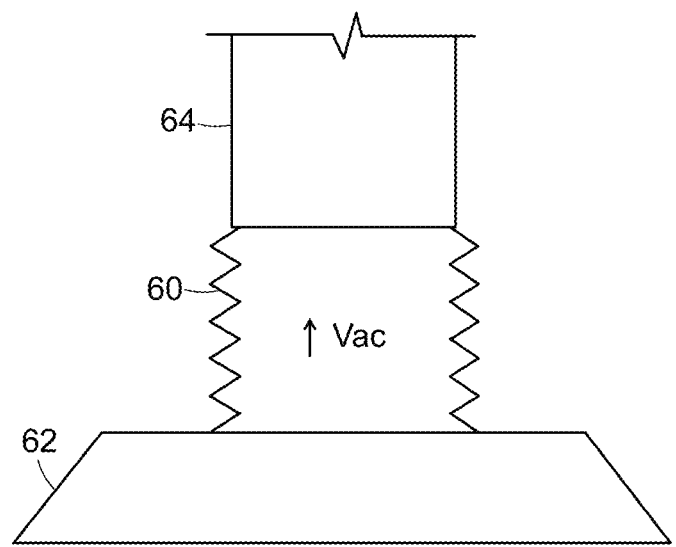
FIGS. 3A and 3B show illustrative diagrammatic views of an end effector of a system of an embodiment of the invention engaging different types of objects.
Figure 3B:
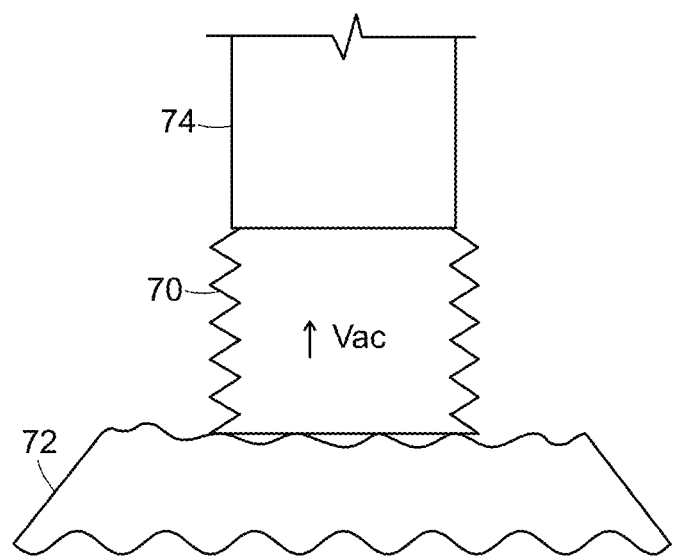

For example, with reference to FIG. 3A, if a good seal is formed between an end effector 60 (which may, for example, be a tubular or conical shaped bellows) and an object 62 on an articulated arm 64, then the vacuum pressure may remain high vacuum and low flow. This will provide that the grasp of object 62 will be maintained by the high vacuum with a lower maximum air flow rate. With reference to FIG. 3B, if a good seal is not formed between an end effector 70 and an irregularly shaped object 72 on an articulated arm 74, then the high flow source will dominate maintaining a high flow, and maintaining a grasp of object 72 with a higher maximum air flow rate.

Figure 4:
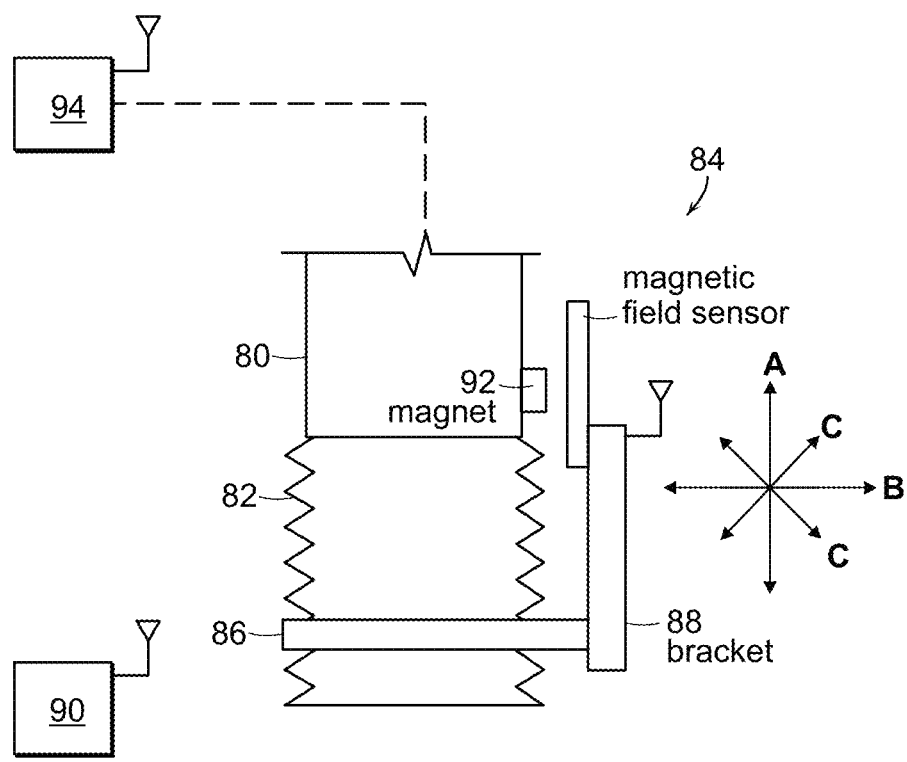
FIG. 4 shows an illustrative diagrammatic view of a detection system together with an end effector of a system of an embodiment of the present invention.

With reference to FIG. 4, in accordance with a further embodiment, the system may include an articulated arm 80 to which is attached an end effector 82, again, which may be a tubular or conical shaped bellows. The end effector 82 also includes a sensor 84 that includes an attachment band 86 on the bellows, as well as a bracket 88 attached to magnetic field sensor 84, and a magnet 92 is mounted on the articulated arm 80. The bellows may move in any of three directions, e.g., toward and away from the articulated arm as shown diagrammatically at A, in directions transverse to the direction A as shown at B, and directions partially transverse to the direction A as shown at C. The magnetic field sensor 84 may communicate (e.g., wirelessly) with a controller 90, which may also communicate with a flow monitor 94 to determine whether a high flow grasp of an object is sufficient for continued grasp and transport as discussed further below. In an embodiment, for example, the system may return the object if the air flow is insufficient to carry the load, or may increase the air flow to safely maintain the load.

During low vacuum/high flow use, a specialized end effector may be used that provides improved grasping of long narrow objects. Certain grippers that are designed for high flow use to acquire and hold an object generally require large apertures in order to obtain an air flow rate that is high enough to be useful for object acquisition. One drawback of some such grippers in certain applications, is that the object to be acquired may be small, not so small that each of its dimensions is smaller than the high flow opening, but small enough that certain of an object's dimensions is smaller than the opening. For example, long narrow objects such as pens, pencils etc., do not occlude enough of the high flow opening to generate sufficient negative forces to hold the object securely.

Figure 5A:
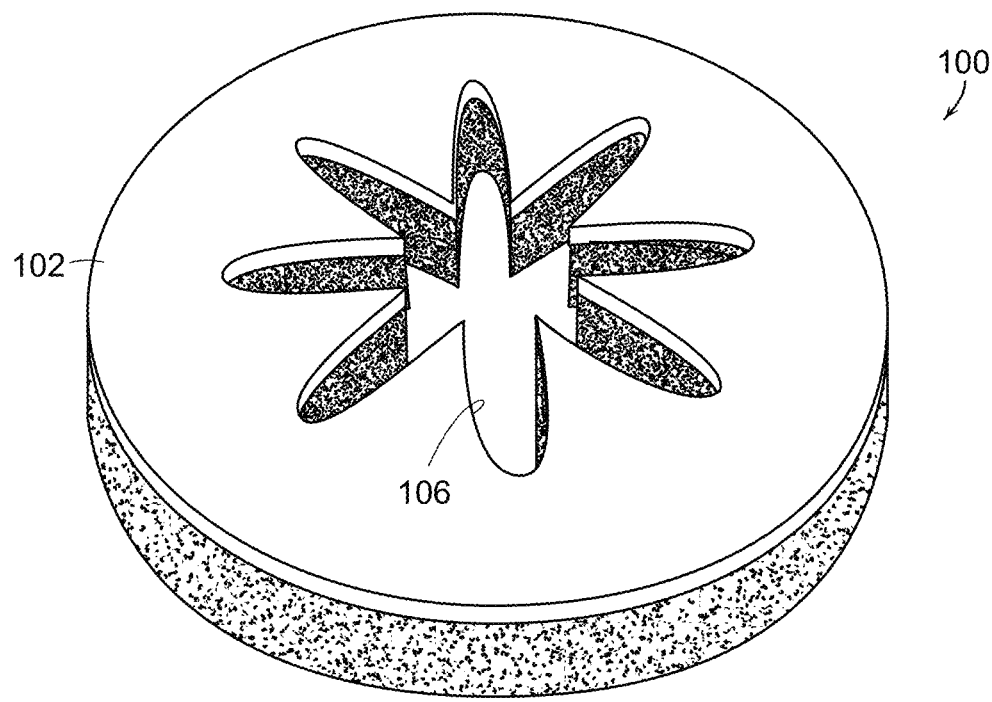
FIGS. 5A and 5B show illustrative photographic views of an end effector cover for use in a system of an embodiment of the present invention.

In accordance with an embodiment therefore, the invention provides a specialized cover for use with a high flow vacuum gripper. In particular and as shown in FIG. 5A (articulated arm facing side) and 5B (object facing side), such a cover 100 may include a proximal back side 102 that does not permit air to flow through the material, and distal front side 104 for engaging objects that is formed of a foam material. Slit openings 106 in the form of a star or asterisk shape are provided through the material in this example. During use, elongated objects may be received along opposing slit openings and held by the foam material.

Figure 6:
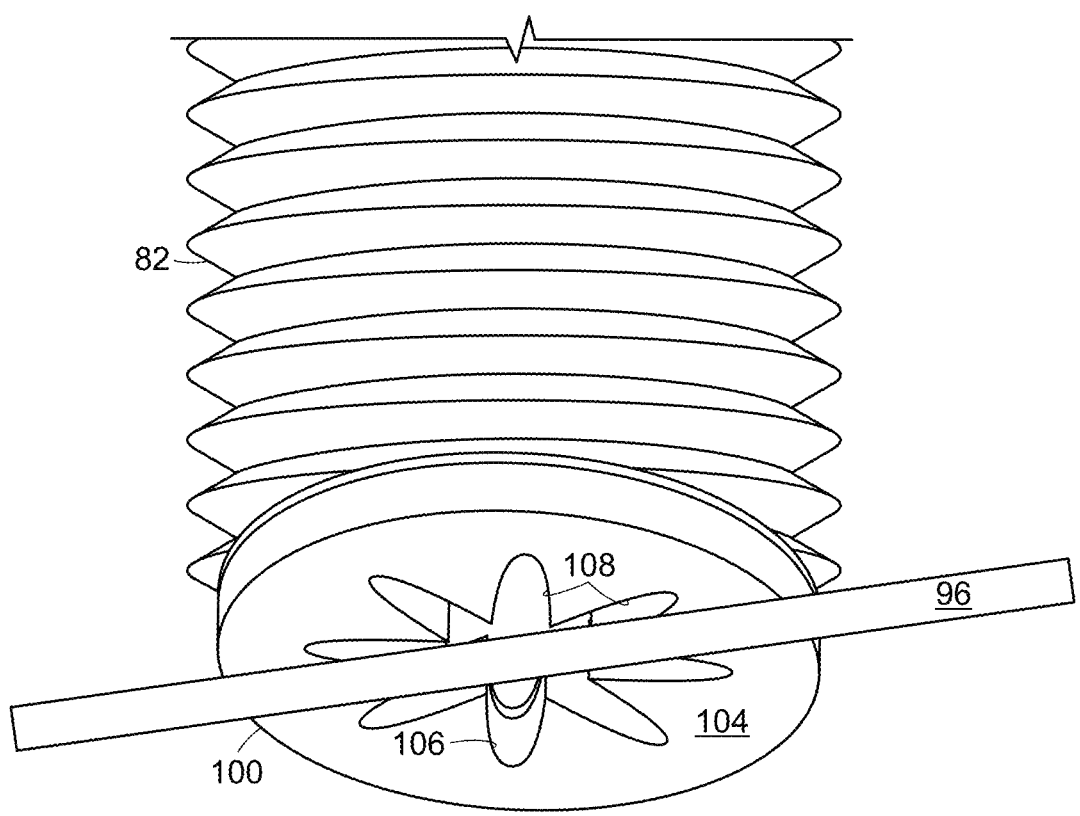
FIG. 6 shows an illustrative diagrammatic view of an end effector of an embodiment of the invention engaging an object.

FIG. 6, for example, shows an elongated object 96 being held against the foam material 104 of a cover 100 that is coupled to the end effector 82. While the elongated object 96 covers some of the opening provided by the slits 106, other portions 108 of the opening provided by the slits 106 remain open. The pattern cut into the material allows for enough area to still obtain a relatively high flow, while providing a number or positions (or orientations) for a long, thin object to block (and thus be held by) a sufficiently high percentage of the air flow.

The compliant foam on the surface 104 contacts the object to be acquired, giving the gripper some compliance while also acting to seal the aperture around the object as the foam is compressed and the high flow vacuum is applied. The aperture cover therefore allows a high flow gripper to effectively pick up long narrow objects with an easy to attach cover that may be held in a tool changer and added or removed from the gripper autonomously during real-time operation In accordance with various embodiments, the cover 100 may be applied to the end effector by a human worker into a friction fitting on the end of the end effector, or in certain embodiments, the cover may be provided in a bank of available end effector attachments that the articulated arm may be programmed to engage as needed, and disengage when finished, e.g., using forced positive air pressure and/or a grasping device that secures the end effector attachment for release from the articulated arm.

The invention therefore provides a system for providing vacuum control to an end effector of an articulated arm, where the system includes a vacuum source for providing a vacuum pressure at a flow rate to the end effector, and the end effector includes a cover including an air flow resistant material on a proximal side of the cover and a compliant material on a distal side of the cover for contacting objects to be grasped. The cover may include an opening that varies significantly in radius from a center of the cover, and the opening may include finger openings that extend radially from the center of the opening. The opening may be generally star shaped or asterisk shaped. The cover may be formed of a compliant material and include compliant foam on a distal side of the cover that engages an object to be grasped, and the cover may include an air flow resistant material on a proximal side of the cover. The vacuum pressure may be no more than about 25,000 Pascals or 50,000 Pascals below atmospheric, and the air flow rate may be at least about 100 cubic feet per minute.

Figure 5B:
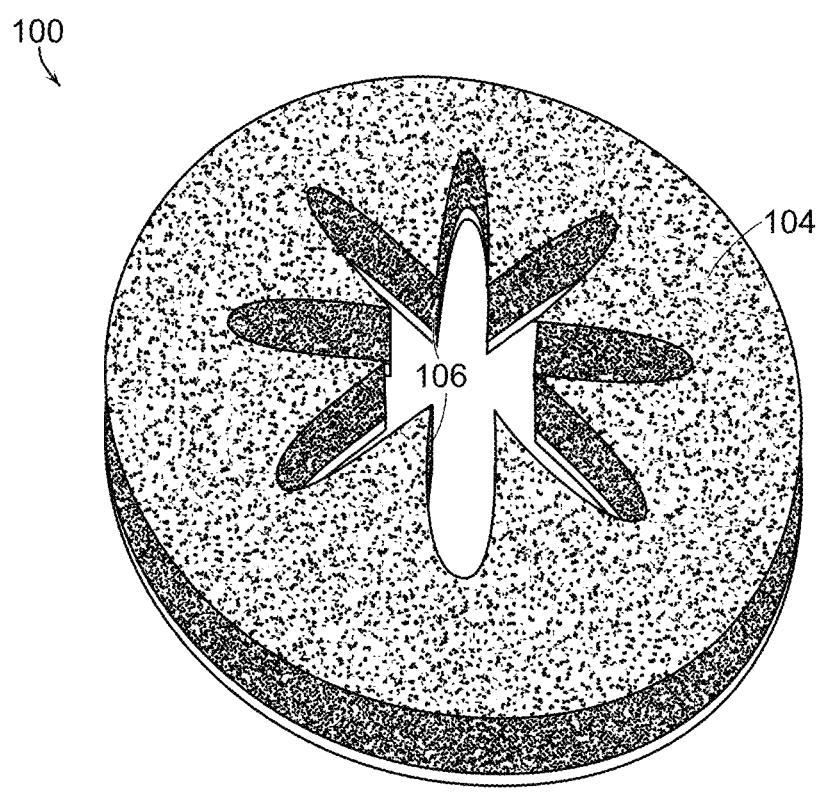
Figure 7A:
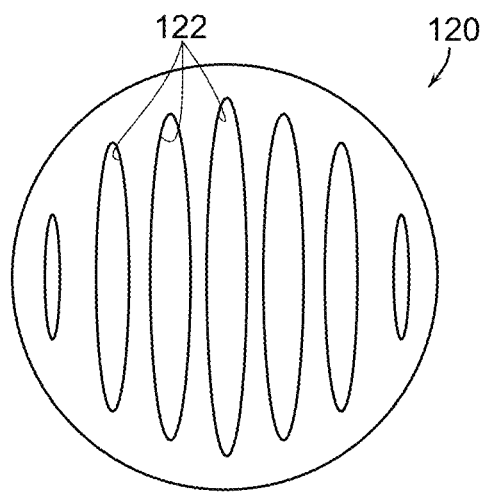
FIGS. 7A-7D show illustrative diagrammatic views of other covers for use with end effectors systems of further embodiments of the present invention.
Figure 7C:
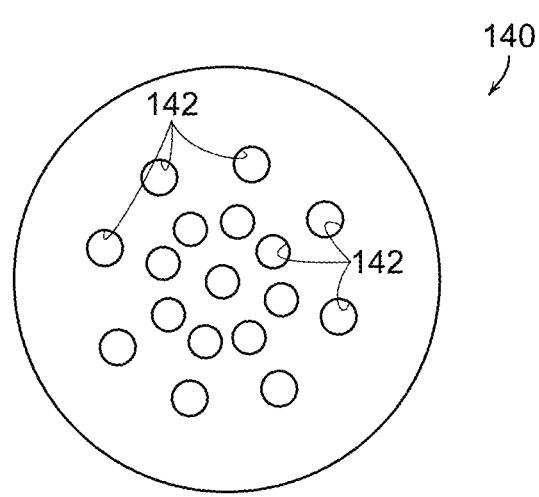
Figure 7B:
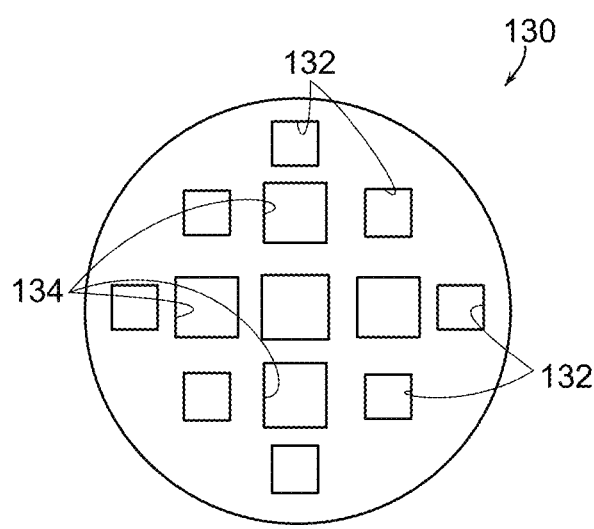
Figure 7D:
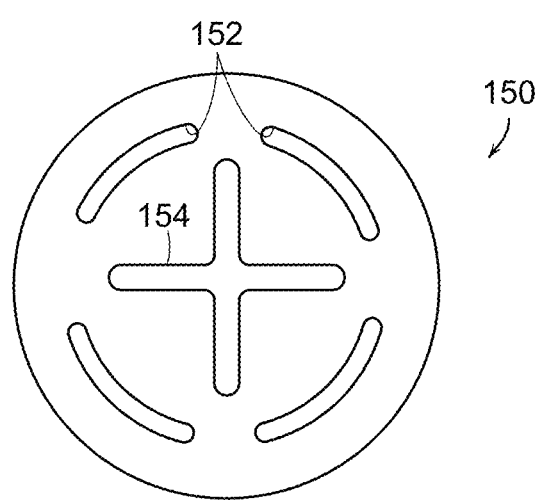

Covers with other types of openings are shown in FIGS. 7A-7D. FIG. 7A, for example, shows a cover 120 that includes slit openings 122. FIG. 7B shows a cover 130 that includes different sized square openings 132, 134. Cover 140 shown in FIG. 7C includes small circular openings 142, and cover 150 shown in FIG. 7D includes differently shaped openings 152 and 154. In each of the covers 100, 120, 130, 140 and 150, a compliant foam surface may face the object to be acquired, and more area of the cover is provided to be open closer to the center of the cover with respect to the outer periphery of each cover. For example, in the cover 100 (shown in FIGS. 5A, 5B), the center of the asterisk shape is most open. In the cover 120, the larger slits are provided in the center. In the cover 130, the larger square openings are provided in the center. In the cover 140, the greater concentration of the circular openings is provided in the center, and in the cover 150, the larger shape 154 is provided in the center.

Figure 8A:
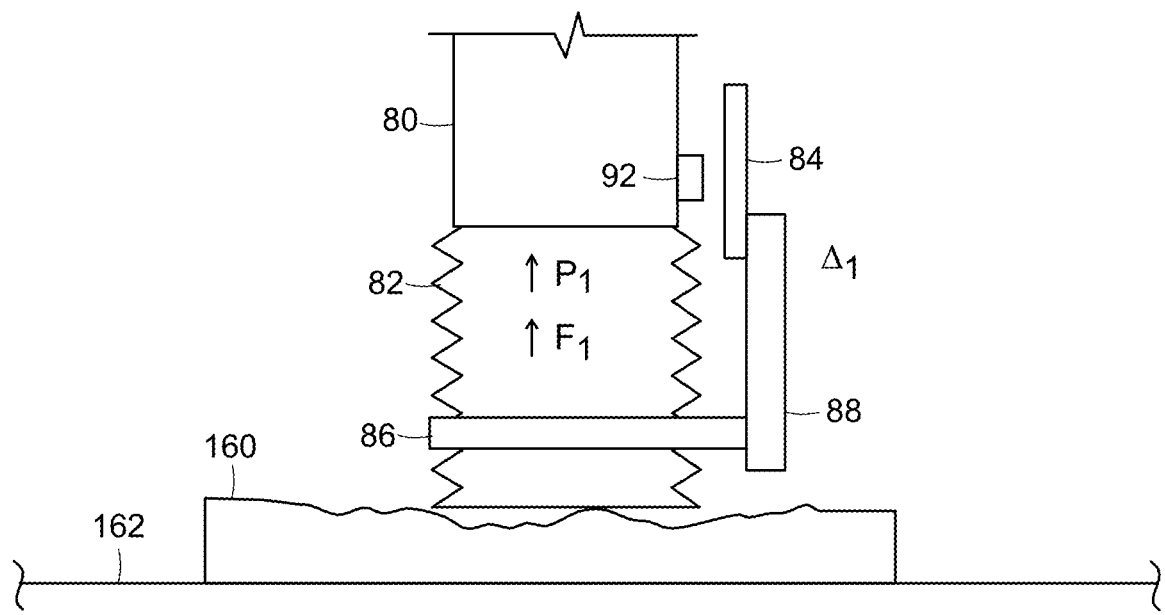
FIGS. 8A and 8B show illustrative diagrammatic views of an end effector in a system of an embodiment of the present invention engaging a relatively light object.
Figure 8B:
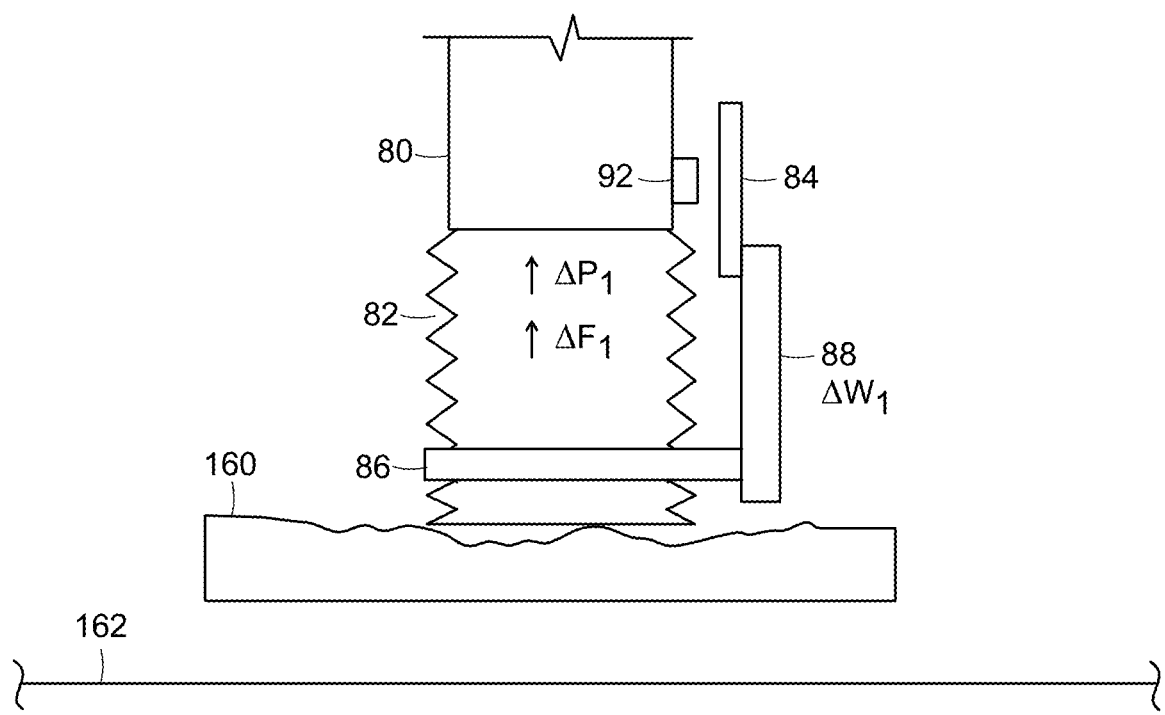
Figure 9A:
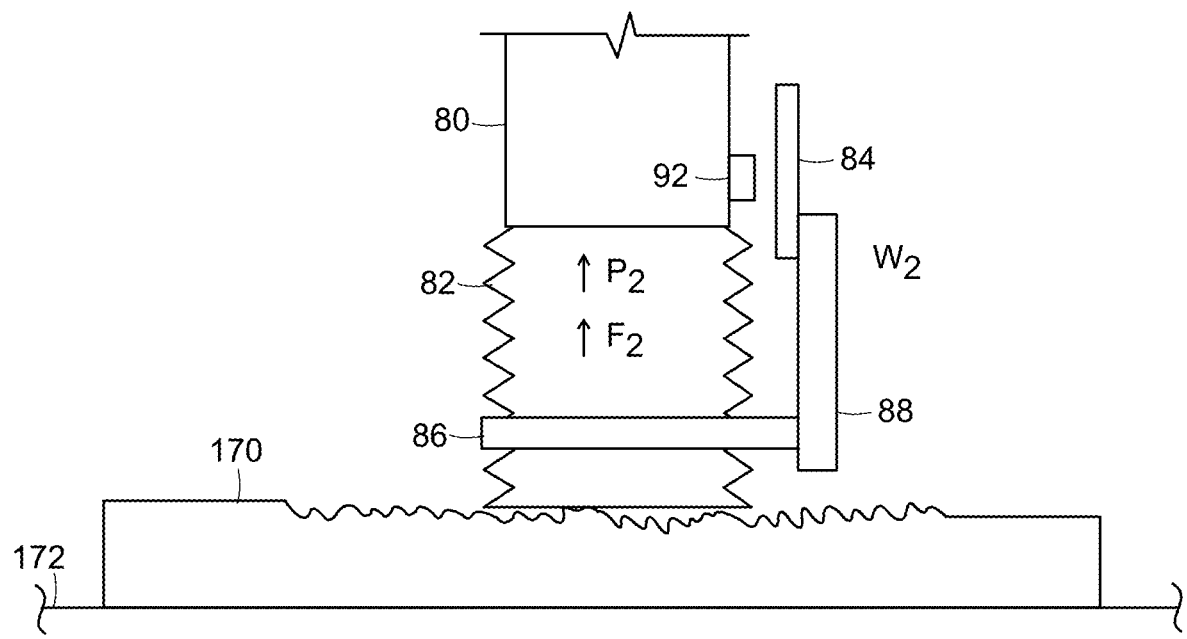
FIGS. 9A and 9B show illustrative diagrammatic views of an end effector in a system of an embodiment of the present invention engaging a relatively heavy object.
Figure 9B:
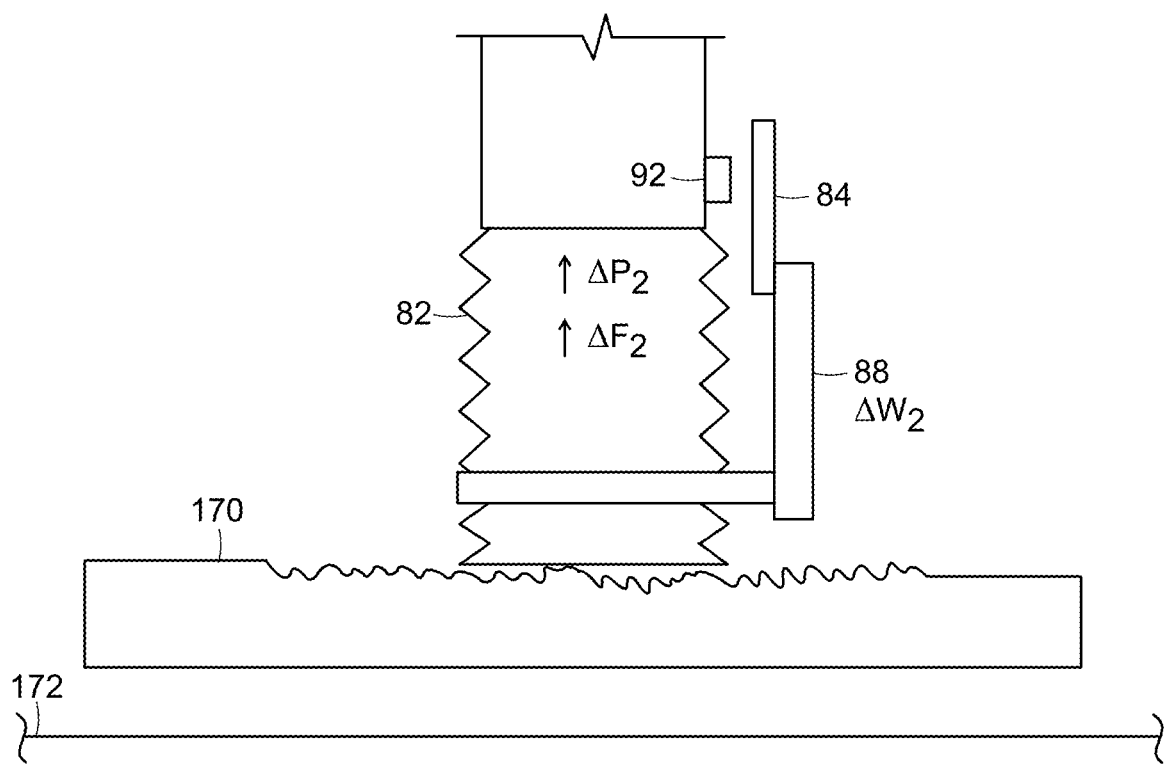

Systems in accordance with certain embodiments of the invention are able to monitor flow within the end effector as well as the weight and balance of an object being grasped. FIGS. 8A and 8B show an object 160 being lifted from a surface 162 by the end effector 82 that includes the load detection device of FIG. 4. Upon engaging the object 160, the system notes the position of the detection device and the level of flow ($F_1$) within the end effector as well as the vacuum pressure ($P_1$) and load ($W_1$) as shown in FIG. 8A. Once the object 160 is lifted (FIG. 8B), the system notes the change in the amount of flow ($\Delta F_1$). In this example, the load provided by the object 160 is relatively light ($\Delta W_1$), and a small variation ($\Delta F_1$) in flow (when considering the load and aperture size) may be accepted. FIGS. 9A and 9B, however, show the end effector lifting a heavy object.

FIGS. 9A and 9B show an object 170 being lifted from a surface 172 by the end effector 82 that includes the load detection device of FIG. 4. Upon engaging the object 170, the system notes the position of the detection device and the level of flow ($F_2$) within the end effector as well as the vacuum pressure ($P_2$) and load ($W_2$) as shown in FIG. 9A. Once the object 170 is lifted (FIG. 9B), the system notes the change in the amount of flow ($\Delta F_2$). As noted above, in this example, the object 170 is heavy, presenting a higher load ($\Delta W_2$). The system will evaluate the load in combination with the flow ($F_2$) and pressure ($P_2$) as well as the change in flow ($\Delta F_2$) and change in pressure ($\Delta P_2$) to assess the grasp of the object. The system may use look-up tables of flow and load values for the sized aperture opening, and/or may use machine learning to develop and maintain information regarding loads that are suitable for different apertures sizes and flow rates. In further embodiments, the system may employ linear performance curves for the vacuum sources for maximum flow and maximum pressure, as adjusted by aperture opening size.

Figure 10A:
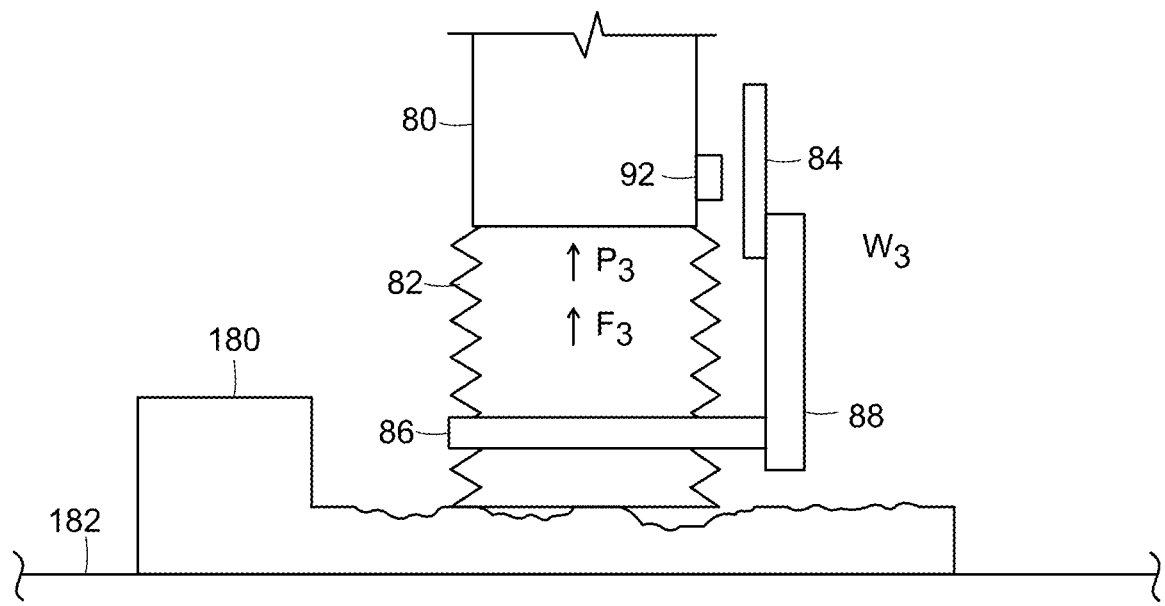
FIGS. 10A and 10B show illustrative diagrammatic views of an end effector in a system of an embodiment of the present invention engaging an object that presents an unbalanced load.
Figure 10B:
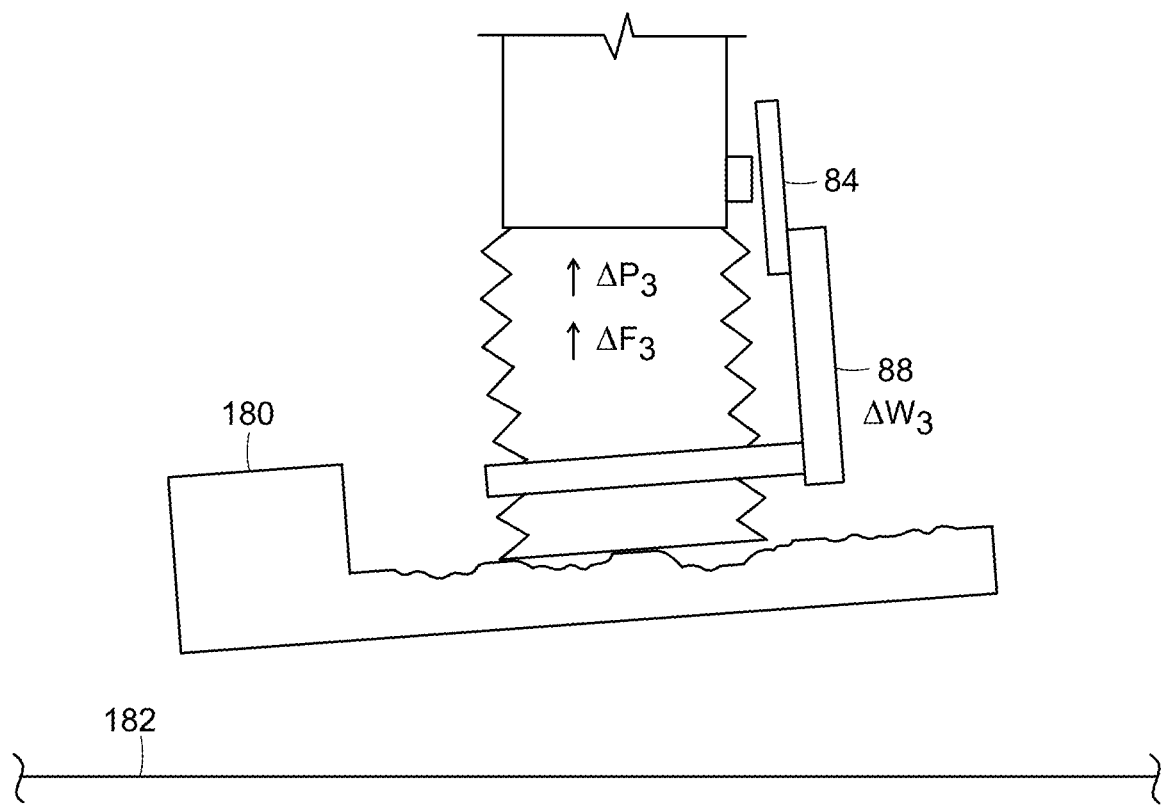

The system may also detect whether a load is not sufficiently balanced. FIGS. 10A and 10B show an object 180 being lifted from a surface 182 by the end effector 82 that includes the load detection device of FIG. 4. Upon engaging the object 180, the system notes the position of the detection device and the level of flow ($F_3$) within the end effector as well as the vacuum pressure ($P_3$) and load ($W_3$) as shown in FIG. 10A. Once the object 180 is lifted (FIG. 10B), the system notes the change in the amount of flow ($\Delta F_3$). In this example, the object 180 presents a non-balanced load. The system will evaluate the load in combination with the flow ($F_3$) and pressure ($P_3$) as well as the change in flow ($\Delta F_3$) and change in pressure ($\Delta P_3$) to assess the grasp of the object. Again, the system may use look-up tables of flow and load values for the sized aperture opening, and/or may use machine learning to develop and maintain information regarding loads that are suitable for different apertures sizes and flow rates. In further embodiments, the system may employ linear performance curves for the vacuum sources for maximum flow and maximum pressure, as adjusted by aperture opening size.

The lifting force may be characterized as a function using any of machine learning, large data analytics, fuzzy logic or linear approximation. Lifting force depends on the vacuum generator performance model and the area of the object within the opening. Hose length and friction are also important. At high flow, pressure loss is related to flow velocity. Pressure loss is related to hose length and hose friction. Absent a performance curve, a linear approximation of the vacuum generator performance may be used.

Figure 11:
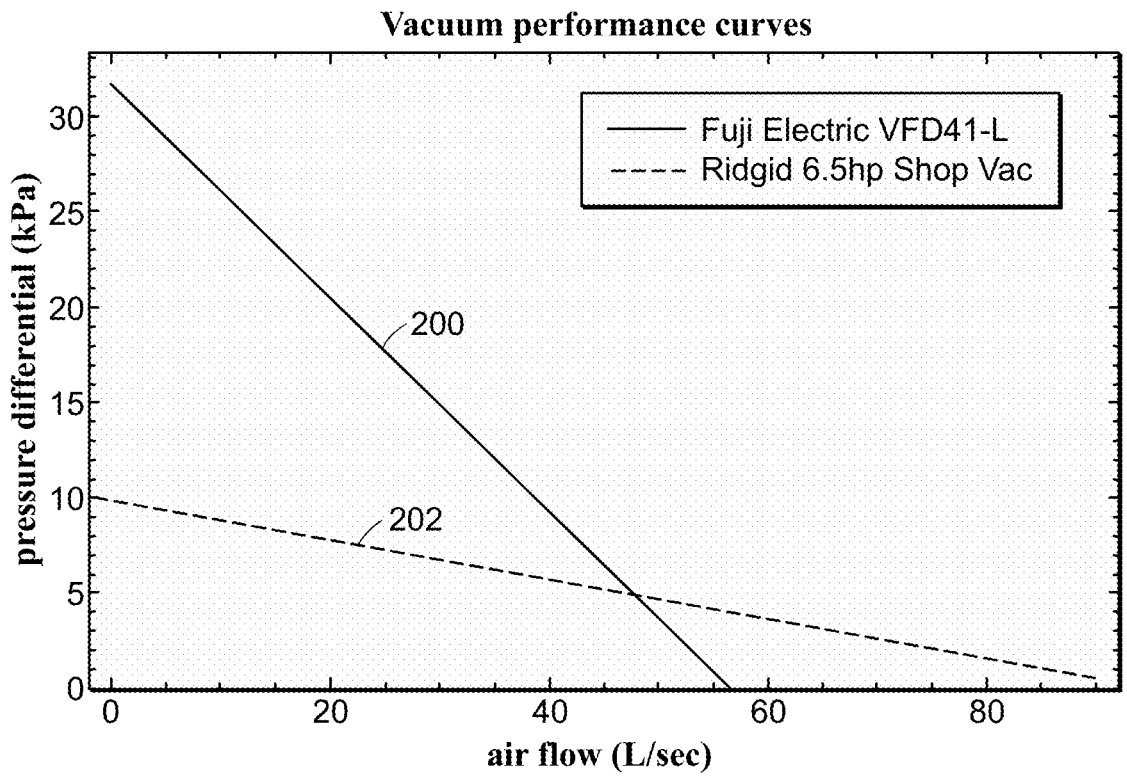
FIG. 11 shows an illustrative graphical representation of air flow verses pressure differential for different vacuum sources.
Figure 12:
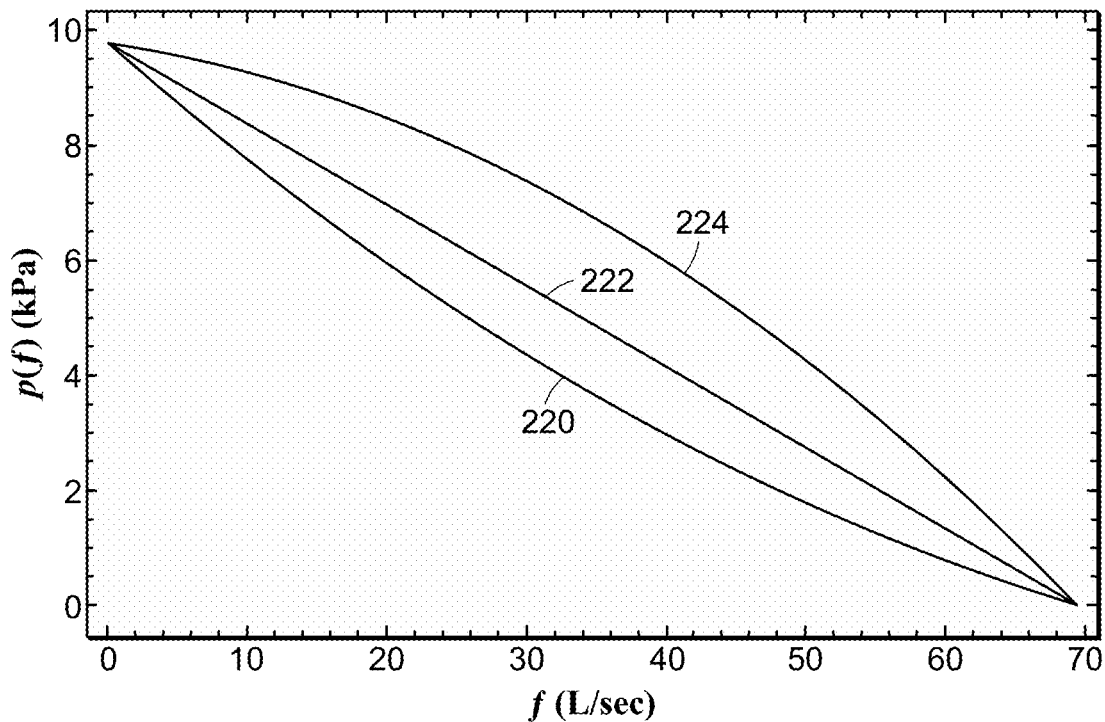
FIG. 12 shows an illustrative graphical representation of air flow verses pressure differential for different parameterizations of performance.

FIG. 11 shows linear performance curves for a blower (at 200) and a shop vacuum (at 202). Performance curves may also be concave or convex, depending on the parameter ds. The term ds parameterizes whether the relationship curve is concave or convex. The degree of concavity or convexity affects high flow gripper performance. FIG. 12 shows vacuum performance curves for ds=0.25 (as shown at 220), ds=1 (as shown at 222) and ds=1.5 (as shown at 224).

Figure 15:
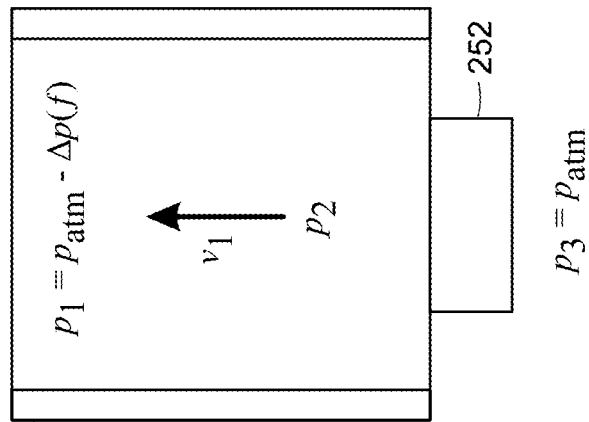
FIG. 15 shows an illustrative diagrammatic side view of the system of FIG. 13 showing flow direction and pressure.
Figure 14:
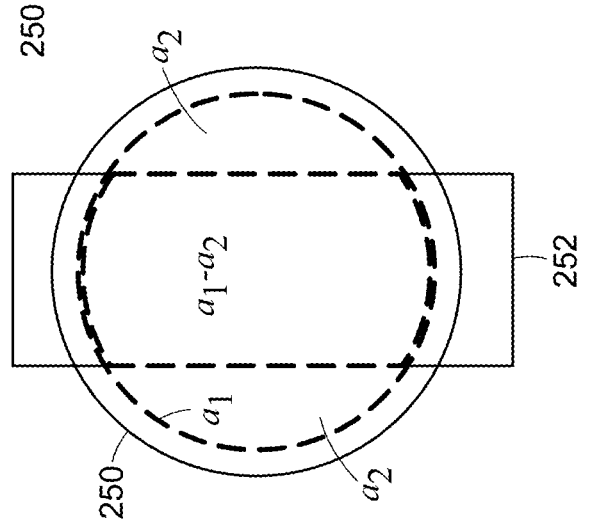
FIG. 14 shows an illustrative diagrammatic end view of the system of FIG. 13 showing the relative areas of the opening.
Figure 13:
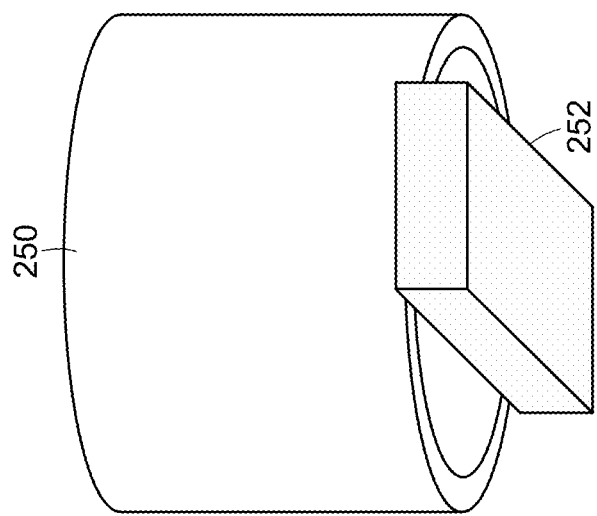
FIG. 13 shows an illustrative diagrammatic model of an end effector aperture and object in a system in accordance with an embodiment of the present invention.
Figure 16:
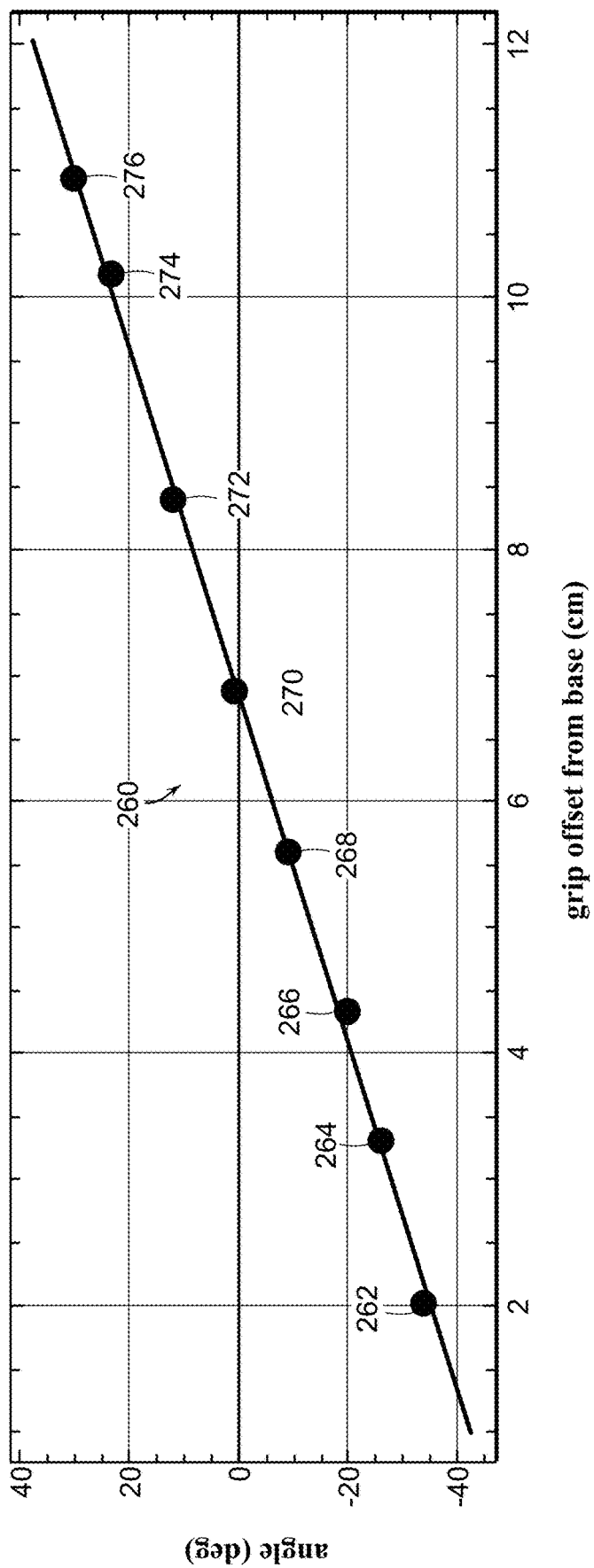
FIG. 16 shows an illustrative graphical representation of grip offset from a base versus angle in a system in accordance with an embodiment of the present invention.

FIGS. 13-15 show a two-pipe model of an example of a high flow gripper for illustrative purposes. As shown in FIG. 13, an end effector 250 is engaging an object 252. FIG. 14 shows that the area of the opening, $a_1$ is partially blocked by the object, leaving openings on either side of the object having a total area of $a_2$. The area that is blocked is shown as $(a_1-a_2)$. FIG. 16 shows at 260 deflection angles versus lateral offset for an object using a bellows suction cup. An optimal aperture for a given maximum flow and maximum pressure, as well as $(a_1-a_2)/a_1$ may be provided. Also, knowing the center of mass of the held object with respect to the gripper, as well as any rotation of the object, the torque may be determined.

Figure 17:
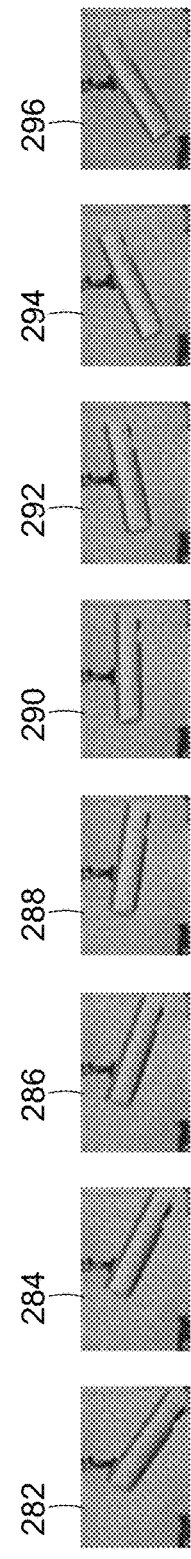
FIG. 17 shows illustrative diagrammatic representations of objects being held at the offset points in FIG. 16.

As shown in FIG. 16, the deflection angles range correlate with grip offset from the base showing offset in one direction (as shown at 262 in FIGS. 16 and 282 in FIG. 17), a balanced load (as shown at 270 in FIGS. 16 and 290 in FIG. 17), and offset in an opposite direction (as shown at 276 in FIGS. 16 and 296 in FIG. 17). The remaining points 264, 266, 268, 272 and 274 correspond with the images 284, 286, 288, 292 and 294 in FIG. 17.

The invention therefore provides, in various embodiments, that load weight, load balance, and flow may be used in a high flow system to provide accurate acquisition and transport of objects in a sortation system.

Those skilled in the art will appreciate that numerous modifications and variations may be made to the above disclosed embodiments without departing from the spirit and scope of the present invention.

What is claimed is:

1. A system for grasping and moving objects using a programmable motion device, said system comprising:
   a high vacuum source for selectively providing a first vacuum pressure with a first maximum air flow rate at a vacuum cup end-effector of the programmable motion device;
   a high flow source for selectively providing a second vacuum pressure with a second maximum air flow rate at the vacuum cup end-effector, the second vacuum pressure being higher than the first vacuum pressure, and the second maximum air flow rate being greater than the first maximum air flow rate;
   a passive selection system comprising a non-return valve for passively selecting between coupling the vacuum cup end-effector to any of the high vacuum source and the high flow source responsive to changes in air flow at the vacuum cup end-effector of the programmable motion device; and
   a load detection device in communication with the vacuum cup end-effector of the programmable motion device, the load detection device including a magnetic field sensor and a magnet, each of which is mounted on one of the vacuum cup end-effector and the programmable motion device, the magnetic field sensor providing position information regarding a position of the vacuum cup end-effector to monitor weight and balance of a load on the vacuum cup end-effector.

2. The system as claimed in claim 1, wherein the first vacuum pressure is at least about 90,000 Pascals below atmospheric.

3. The system as claimed in claim 1, wherein the first maximum air flow rate is no more than about 5 cubic feet per minute.

4. The system as claimed in claim 1, wherein the second vacuum pressure is no more than about 50,000 Pascals below atmospheric.

5. The system as claimed in claim 1, wherein the second vacuum pressure is no more than about 25,000 Pascals below atmospheric.

6. The system as claimed in claim 1, wherein the second maximum air flow rate is at least about 100 cubic feet per minute.

7. The system as claimed in claim 1, wherein the high vacuum source includes an ejector coupled to a compressor.

8. The system as claimed in claim 1, wherein the high flow source includes a blower.

9. The system as claimed in claim 1, wherein the system includes a release source for selectively providing a positive pressure air flow at the vacuum cup end-effector of the programmable motion device.

10. The system as claimed in claim 9, wherein the system further includes an active selection system for actively selecting between coupling the vacuum cup end-effector to either the release source or the non-return valve of the passive selection system.

11. The system as claimed in claim 1, wherein the system further includes a flow monitor for providing flow information regarding a flow of air associated with the vacuum cup end-effector.

12. A system for grasping and moving objects using a programmable motion device, said system comprising:
    a high vacuum source for selectively providing a first vacuum pressure with a first maximum air flow rate at a vacuum cup end-effector of the programmable motion device;
    a high flow source for selectively providing a second vacuum pressure with a second maximum air flow rate at the vacuum cup end-effector, the second vacuum pressure being higher than the first vacuum pressure, and the second maximum air flow rate being greater than the first maximum air flow rate;
    a passive selection system comprising a non-return valve for passively selecting between coupling the vacuum cup end-effector to any of the high vacuum source and the high flow source responsive to changes in air flow at the vacuum cup end-effector of the programmable motion device; and
    a flow monitor for providing flow information regarding a flow of air associated with the vacuum cup end-effector, said flow information being indicative of whether a high flow grasp of an object is sufficient for continued grasp and transport of the object.

13. The system as claimed in claim 12, wherein the first vacuum pressure is at least about 90,000 Pascals below atmospheric.

14. The system as claimed in claim 12, wherein the first maximum air flow rate is no more than about 5 cubic feet per minute.

15. The system as claimed in claim 12, wherein the second vacuum pressure is no more than about 50,000 Pascals below atmospheric.

16. The system as claimed in claim 12, wherein the second vacuum pressure is no more than about 25,000 Pascals below atmospheric.

17. The system as claimed in claim 12, wherein the second maximum air flow rate is at least about 100 cubic feet per minute.

18. The system as claimed in claim 12, wherein the high vacuum source includes an ejector coupled to a compressor.

19. The system as claimed in claim 12, wherein the high flow source includes a blower.

20. The system as claimed in claim 12, wherein the system includes a release source for selectively providing a positive pressure air flow at the vacuum cup end-effector of the programmable motion device.

21. The system as claimed in claim 20, wherein the system further includes an active selection system for actively selecting between coupling the vacuum cup end-effector to either the release source or the non-return valve of the passive selection system.

22. The system as claimed in claim 12, wherein the system further includes a load detection device in communication with the vacuum cup end-effector of the programmable motion device, the load detection device including a magnetic field sensor and a magnet, each of which is mounted on one of the vacuum cup end-effector and the programmable motion device, the magnetic field sensor providing position information regarding a position of the vacuum cup end-effector to monitor weight and balance of a load on the vacuum cup end-effector.

23. A method of grasping and moving objects using a programmable motion device, said method comprising:
providing a vacuum cup end-effector on a distal end of the programmable motion device, said vacuum cup end-effector including at least one opening in a distal end thereof through which a vacuum is provided;
passively selecting between coupling the vacuum cup end-effector of the programmable motion device to any of a high vacuum source and a high flow source responsive to changes in air flow at the vacuum cup end-effector of the programmable motion device, the high vacuum source for selectively providing a first vacuum pressure with a first maximum air flow rate at the vacuum cup end-effector of the programmable motion device, and the high flow source for selectively providing a second vacuum pressure with a second maximum air flow rate at the vacuum cup end effector, the second vacuum pressure being higher than the first vacuum pressure, and the second maximum air flow rate being greater than the first maximum air flow rate; and
providing position information by a load detection device regarding a position of the vacuum cup end-effector to monitor weight and balance of a load on the vacuum cup end-effector, the load detection device being in communication with the vacuum cup end-effector of the programmable motion device, and including a magnetic field sensor and a magnet, each of which is mounted on one of the vacuum cup end-effector and the programmable motion device.

24. The method as claimed in claim 23, wherein the first vacuum pressure is at least about 90,000 Pascals below atmospheric.

25. The method as claimed in claim 23, wherein the first maximum air flow rate is no more than about 5 cubic feet per minute.

26. The method as claimed in claim 23, wherein the second vacuum pressure is no more than about 50,000 Pascals below atmospheric.

27. The method as claimed in claim 23, wherein the second vacuum pressure is no more than about 25,000 Pascals below atmospheric.

28. The method as claimed in claim 23, wherein the second maximum air flow rate is at least about 100 cubic feet per minute.

29. The method as claimed in claim 23, wherein the high vacuum source includes an ejector coupled to a compressor.

30. The method as claimed in claim 23, wherein the high flow source includes a blower.

31. The method as claimed in claim 23, wherein the method further includes selectively providing a positive pressure air flow at the vacuum cup end-effector of the programmable motion device using a non-return valve.

32. The method as claimed in claim 31, wherein the method further includes actively selecting between coupling the vacuum cup end-effector to either the release source or the non-return valve of the passive selection system.

33. The method as claimed in claim 23, wherein the method further includes providing flow information regarding a flow of air associated with the vacuum cup end-effector.

* * * * *